United States Patent [19]

Lange et al.

[11] Patent Number: 5,575,257
[45] Date of Patent: Nov. 19, 1996

[54] METHOD AND DEVICE FOR THE OPEN-LOOP CONTROL OF AN INTERNAL-COMBUSTION ENGINE

[75] Inventors: Joerg Lange, Eberdingen; Heinz Stutzenberger, Vaihingen; Thomas Lehmann, Oberriexingen; Christian Koehler, Ludwigsburg, all of Germany

[73] Assignee: Robert Bosch GmbH, Stuttgart, Germany

[21] Appl. No.: 358,435

[22] Filed: Dec. 19, 1994

[30] Foreign Application Priority Data

Dec. 18, 1993 [DE] Germany .......................... 43 43 353.7

[51] Int. Cl.$^6$ ...................................................... F02M 3/00
[52] U.S. Cl. ...................................................... 123/337.11
[58] Field of Search ........................... 123/339.1, 339.11, 123/339.19

[56] References Cited

U.S. PATENT DOCUMENTS

| | | | |
|---|---|---|---|
| 4,144,853 | 3/1979 | Maruoka et al. | 123/339 |
| 5,320,077 | 6/1994 | Kamiya et al. | 123/339.11 |
| 5,333,585 | 8/1994 | Kuroda | 123/339.11 |
| 5,463,993 | 11/1995 | Livshits et al. | 123/339.11 |
| 5,495,835 | 3/1996 | Ueda | 123/339.11 |
| 5,497,745 | 3/1996 | Cullen et al. | 123/339.11 |

Primary Examiner—Raymond A. Nelli
Attorney, Agent, or Firm—Kenyon & Kenyon

[57] ABSTRACT

In a method and device for the open-loop control of an internal-combustion engine, the change in the torque caused by an influencing of the ignition angle is compensated for by a correspondingly adjusted influencing of the air inducted by the internal-combustion engine. Thus, the accelerator-pedal characteristic is hardly influenced in the case of a change in the ignition angle. The method and device can be used, for example, to accelerate the heating up of a catalytic converter after start-up of the internal-combustion engine. To reinforce the heating operation and to reduce emission, an intervention in the air/fuel ratio can be made at the same time, and a switching signal can be produced, for example, for a secondary air pump. The air inducted by the internal-combustion engine is generally influenced by an idle-speed actuator, which is arranged in a by-pass duct leading to the throttle valve. In the case of internal-combustion engines having an electronically controlled throttle valve, in place of the idle-speed actuator, the throttle valve can also be influenced accordingly. Weighting factors which depend on the operating state of the internal-combustion engine, are used to weight the influencing of the ignition angle, the idle-speed actuator, the throttle valve, and/or the air/fuel ratio.

15 Claims, 5 Drawing Sheets

METHOD AND DEVICE FOR THE OPEN-LOOP CONTROL OF AN INTERNAL-COMBUSTION ENGINE

BACKGROUND INFORMATION

U.S. Pat. No. 4,144,853 describes a method and device for the open-loop control of an internal-combustion engine by retarding an ignition angle during idle operation; opening the throttle valve to attain a higher engine speed; and quickly warming up the internal-combustion engine and the exhaust gases.

SUMMARY OF THE INVENTION

In accordance with the present invention, an ignition angle of an internal combustion engine can be changed without altering the engine speed of the internal-combustion engine. The effect the intervention (i.e., the change) in the ignition angle has on the engine speed is compensated by an intervention in the throttle valve or on the idle-speed actuator (a compensating operation). Consequently, ignition angle changes have no influence on an accelerator-pedal characteristic.

In accordance with the present invention, the ignition angle is altered by gating a signal for the ignition angle with a first correction value. The compensating operation is carried out by gating a signal for the air inducted by the internal-combustion engine with a second correction value.

In accordance with a second embodiment of the present invention, a third correction value is provided, which is gated with the signal for the air/fuel ratio, in order to achieve optimal exhaust values during the ignition-angle alteration.

In accordance with a third embodiment of the present invention, the correction values are generated by linking reference values read out of engine characteristics maps to weighting factors, which influence the effectiveness of the individual interventions in dependence upon the operating state of the internal combustion engine. The weighting factors are determined from characteristic curves in dependence upon a suited operating parameter. In accordance with a further embodiment of the present invention, the operating parameter is related to a threshold value. For example, the operating parameter may be divided by this threshold value, the threshold value being specified in dependence upon a start-up temperature of the internal-combustion engine.

The method according to the present invention is particularly suited for quickly heating up a catalytic converter in the exhaust-gas system of the internal-combustion engine. In this type of application, the first correction value is used to retard the ignition angle, in order to quickly heat up the catalytic converter. The second correction value is then applied to open the throttle valve or the idle-speed actuator further, so that the accelerator-pedal characteristic is retained, in spite of displacement of the ignition angle, so that there is no loss of ride comfort.

DETAILED DESCRIPTION OF THE INVENTION

As described herein, the present invention allows a catalytic converter to be heated up to its operating temperature very quickly following start-up of the internal-combustion engine. The present invention, however, is not limited to this application, but rather can be utilized in any application in which the aim is to control various parameters of the internal-combustion engine as coordinated parameters.

The present invention is particularly useful when it is necessary to prevent an ignition-angle intervention from affecting the torque of the internal-combustion engine. If the ignition angle is retarded, for example, a loss of torque occurs. This loss of torque is compensated in the case of the method according to the present invention in that the idle-speed actuator is opened further. It is thereby achieved that the accelerator-pedal characteristic is retained independently of the ignition angle. Since, as a rule, the retardation of the ignition angle is required only in certain operating states, the method according to the present invention also provides for a gradual coordinated termination (notching down) of the ignition angle intervention and the idle-speed actuator intervention, i.e., reducing them to zero. As an example, in accordance with an embodiment of the present invention, the function for quickly heating up the catalytic converter is required only within a short interval after start-up of the internal-combustion engine.

Figure 1:
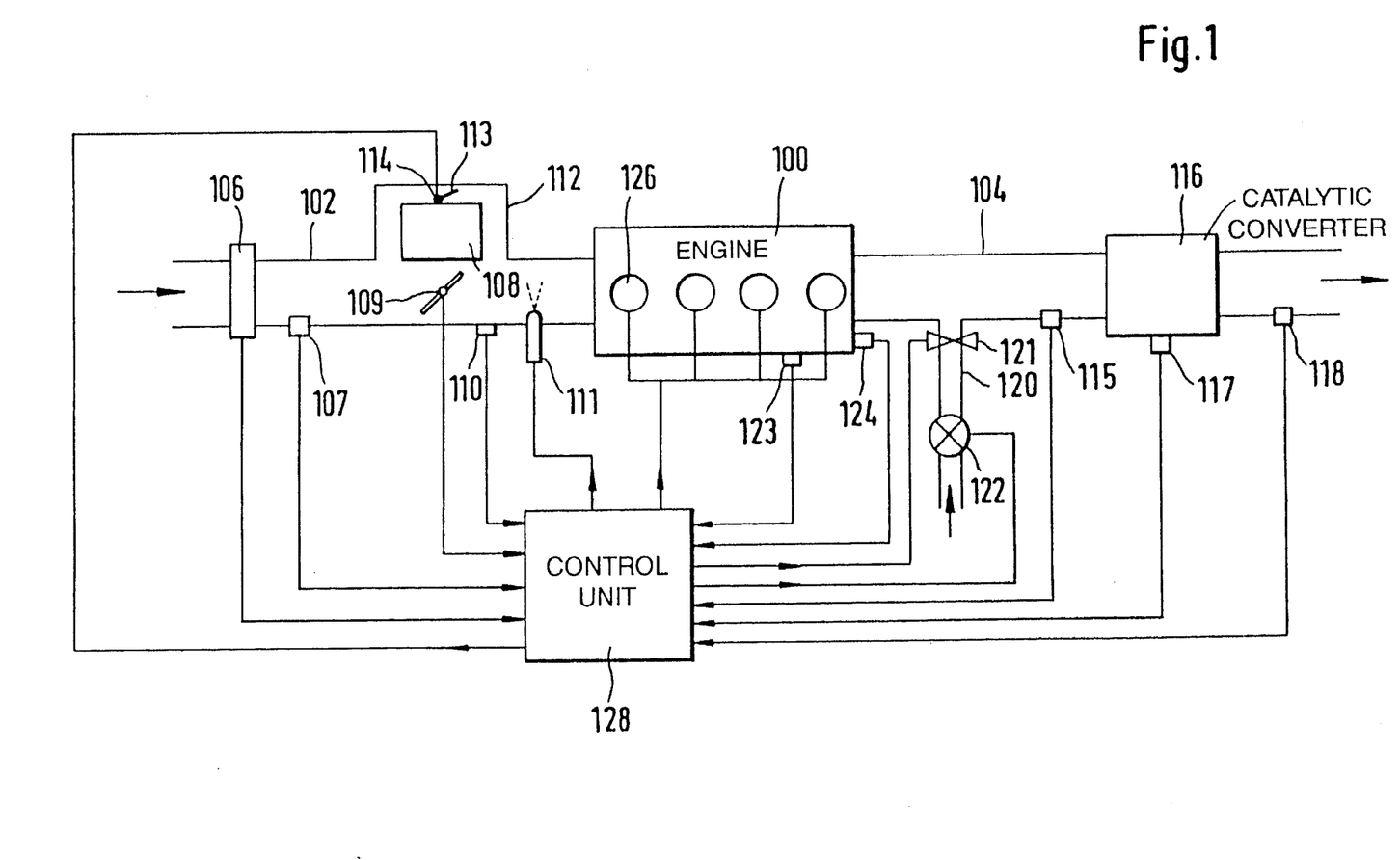
FIG. 1 shows a schematic representation of an internal-combustion engine.

FIG. 1 shows an internal-combustion engine 100 having various components. The internal-combustion engine 100 is supplied with an air-fuel mixture via an induction section 102, and the exhaust gases from the internal-combustion engine 100 are given off into an exhaust duct 104. Arranged in the induction section 102—in the direction of flow of the inducted air—is an air-flow sensor or mass air-flow sensor 106, a temperature sensor 107 for detecting the temperature of the inducted air, a throttle valve 108 with a sensor 109 for detecting the opening angle of the throttle valve 108, a pressure sensor 110 and one or more injection nozzles 111. A by-pass duct 112, in which an idle-speed actuator 113 together with a drive 114 are arranged, runs around the throttle valve 108. In the case that the idle-speed actuator 113 is operated with open-loop control, the opening angle of the idle-speed actuator 113 is known from the trigger signals of the drive 114. If the idle-speed actuator is supposed to be operated with closed-loop control, then a sensor (not shown in FIG. 1) is additionally required for detecting the opening angle of the idle-speed actuator 113.

Arranged in the exhaust-gas duct 104—viewed in the direction of flow of the exhaust gases—are a first oxygen sensor 115, a catalytic converter 116, together with a temperature sensor 117 for detecting the temperature of the catalytic converter 116, and a second oxygen sensor 118. Upstream from the first oxygen sensor 115, a secondary air line 120 opens through into the exhaust-gas duct 104. The intake port of the secondary air line 120 leading into the exhaust-gas duct 104 can be sealed off by means of a valve 121. Fresh air can be blown through the secondary air line 120 into the exhaust-gas duct 104 by means of a secondary air pump 122.

A temperature sensor 123 and a speed sensor 124 are mounted on the internal-combustion engine 100. In addition, the internal-combustion engine 100 has, for example, four spark plugs 126 for igniting the air/fuel mixture in the cylinders.

The output signals from the air-flow sensor or the mass air-flow sensor 106, from the temperature sensor 107; from the sensor 109 for detecting the opening angle of the throttle valve 108; from the pressure sensor 110; in some instances, from the sensor for detecting the opening angle of the idle-speed actuator 113; from the first oxygen sensor 115; from the temperature sensor 117; from the second oxygen sensor 118; from the temperature sensor 123, and from the speed sensor 124; are supplied to a central control unit 128 via appropriate connecting lines. The control unit 128 evaluates the sensor signals and, by way of additional connecting lines, triggers the injection nozzle or the injection nozzles 111, the drive 114 of the idle-speed actuator 113, the valve 121, the secondary air pump 122, and the spark plugs 126. The individual components described here are not necessarily all required at the same time for implementing the method according to the present invention and, consequently, do not need to all be present. Depending upon the specific embodiment of the present invention, a larger or smaller sub-combination of these individual components suffices.

Figure 2:
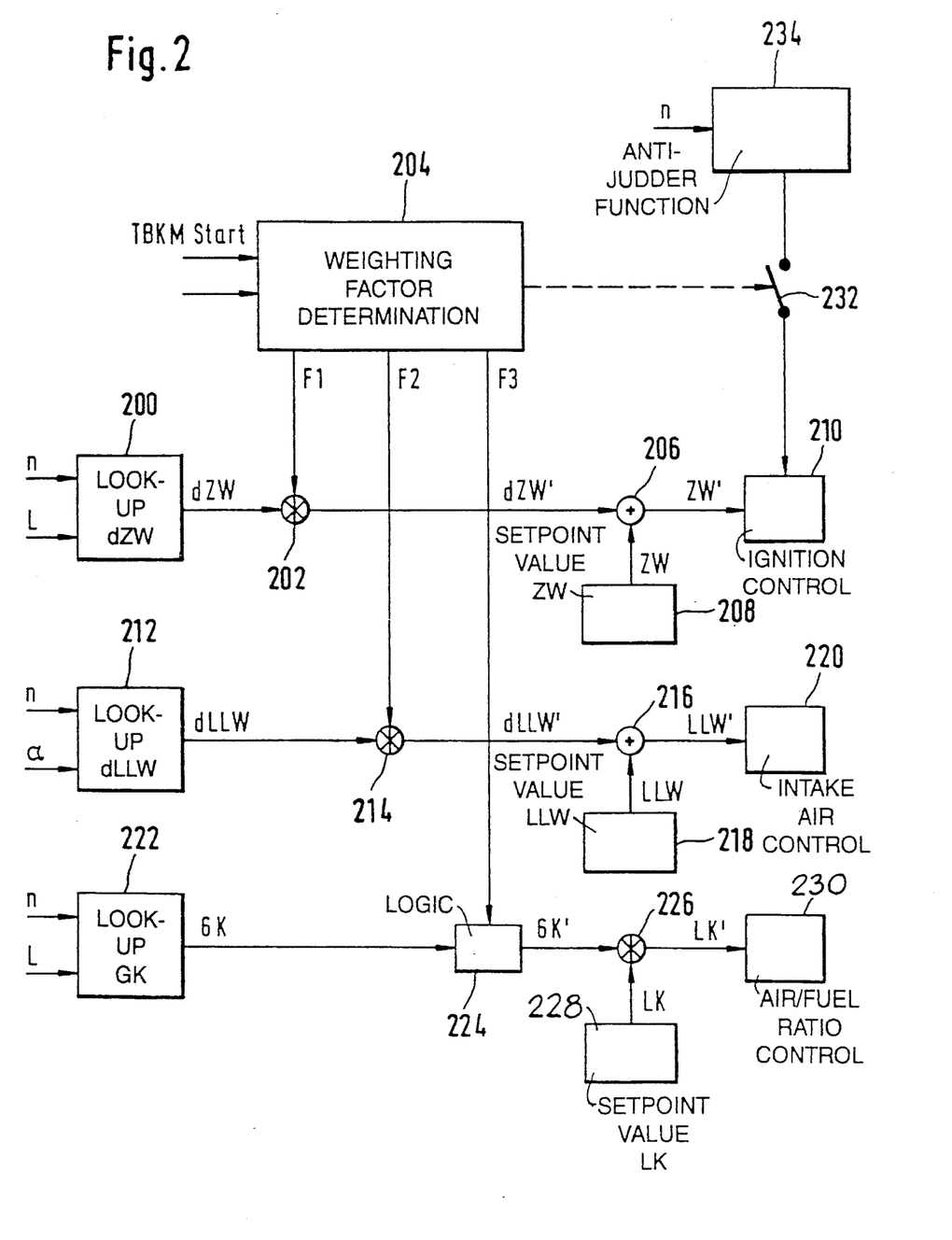
FIG. 2 is a functional block diagram of an embodiment of a controller according to the present invention.

The method of the present invention, as carried out by the control unit 128, will now be described with reference to FIG. 2. FIG. 2 depicts a functional block diagram of an exemplary embodiment of a controller in accordance with the present invention. In accordance with the block diagram of FIG. 2, setpoint values are provided for the ignition angle ZW, for the opening angle LLW of the idle-speed actuator 113, and for the air/fuel ratio LK, with first, second and third correction values dZW'dLLW' and GK' respectively. The purpose of the correction value dZW' for the ignition angle ZW is to heat up the catalytic converter 116 to operating temperature as quickly as possible after start-up of the internal-combustion engine 100. The correction value dLLW' for the opening angle LLW of the idle-speed actuator 113 is used to compensate for the influence of the correction value dZW' on the torque. The correction value GK' for the air/fuel ratio LK serves to optimally adjust the heating effect and the exhaust-gas loading to one another.

A basic value dZW for the correction value dZW' is output by an engine characteristics map (look-up table) 200, into which a signal for the engine speed n and a signal for the load L are input. The engine speed n is determined with the help of the speed sensor 124 depicted in FIG. 1. The load L can be determined in various ways, for example with the help of the air-flow sensor or the mass air-flow sensor 106, the pressure sensor 110, the sensor 109 for detecting the opening angle of the throttle valve 108, etc. The signal for the basic value dZW is routed to a first input of a node 202.

Figure 3:
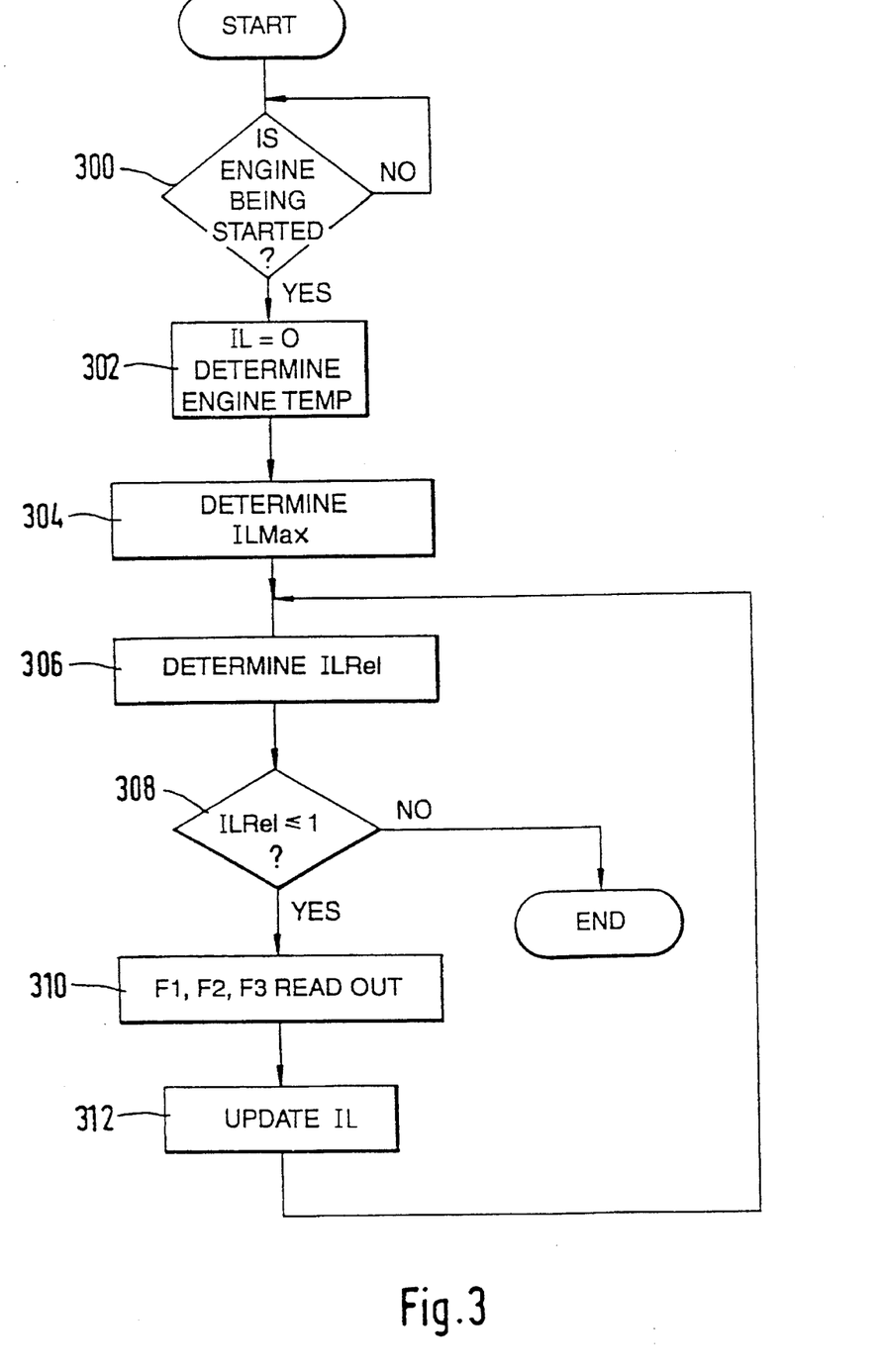
FIG. 3 is a flow chart illustrating the method according to the present invention.

A weighting factor F1 is applied to the second input of the node 202. The weighting factor F1, which is output from block 204, generally has values of between 0 and 1. It establishes how strong the effect of the basic value dZW on the ignition angle ZW is in the final analysis. This is necessary because the ignition angle ZW is only supposed to be influenced in certain operating states. In these operating states, the weighting factor F1 has a large value, for example the value 1. At the beginning and toward the end of these operating states, the weighting factor F1 can be increased from a value 0 to a large value, or lowered from a large value to 0. Outside of these operating states, the weighting factor F1 has the value 0, so that the basic value dZW has no influence on the ignition angle ZW. The weighting factor F1 is output by a block 204. Details for determining the weighting factor F1 by means of block 204 are shown in FIG. 3 and described in the corresponding text.

The block 204 has two further outputs for outputting additional weighting factors F2 and F3. A signal TBKMstart, which represents the temperature of the internal combustion engine 100 at the start-up of the internal-combustion engine 100, is applied to a first input of the block 204. There can also be another input, where a signal for an operating parameter is being applied, from which the just attained heating effect of the catalytic converter can be derived in some form. This operating parameter can be, for example, the temperature of the catalytic converter 116 detected by the temperature sensor 117, a temperature of the catalytic converter 116 determined with the help of a temperature model, a load signal L, a signal for the fuel mass, a signal for the number of crankshaft revolutions, a signal for the temperature TBKM of the internal-combustion engine 100, or also a timing signal.

The node 202 multiplies the basic value dZW by the weighting factor F1 and, at its output, holds ready a signal for the correction value dZW' of the ignition angle ZW. This signal is routed to a first input of a node 206, whose second input is connected to the output of a block 208. Block 208 provides the setpoint value for the ignition angle ZW. The setpoint value for the ignition angle ZW and the correction value dZW' are added in the node 206, and the composite signal is routed for further processing to a block 210, which in the final analysis leads to a corresponding triggering of the spark plugs 126.

A pilot value LLW for the idle-speed actuator 113 is influenced in a similar manner. In dependence upon the input variables, engine speed n and opening angle ∝ of the throttle valve 108, an engine characteristics map (look-up table) 212 outputs a signal for the basic value dLLW. This signal is routed to a first input of a node 214. The second input of the node 214 is linked to the output of the block 204, where the weighting factor F2 is held ready. The node 214 multiplies the signal for the basic value dLLW by the weighting factor F2 and, at its output, makes available a signal for the correction value dLLW'. The signal for the correction value dLLW' is routed to a first input of a node 216. A pilot value LLW for the idle-speed actuator 113, which is produced by a block 218, is applied to the second input of the node 216. The node 216 adds the signals for the pilot value LLW and the correction value dLLW' and outputs a signal LLW'. The idle-speed actuator 113 is triggered in dependence upon this signal LLW'. This is depicted by a block 220, into which the signal LLW' is input. The structure of the block 220 is not significant for the present invention and is, therefore, not described in greater detail.

Furthermore, the air/fuel ratio LK is influenced by the circuit arrangement according to FIG. 2. This influencing is carried out by means of a correction value GK'. A basic value GK for the correction value GK' is output by an engine characteristics map (look-up table) 222, into which the engine speed n and the load L are injected as input variables. The basic value GK output by the engine characteristics map 222 is injected into a first input of a logic operations block 224. The second input of the logic operations block is linked to the output of the block 204, where the weighting factor F3 is made available. The basic value GK can assume values between 0 and 2, the value 1 signifying that the air/fuel ratio LK is not influenced. The weighting factor F3—in the Same way as the weighting factors F1 and F2—has a value of between 0 and 1. In the case that F3 has the value 0, the logic operations block 224 outputs the value 1 at its output, independently of whatever value the basic value GK has.

The logic operations block 224 generally outputs a correction value GK', which lies closer to the value 1 than does the basic value GK being applied to the input of the logic operations block 224. This is achieved in that the deviation of the basic value GK from the value 1 is scaled with the weighting factor F3 in the logic operations block 224. In other words, the logic operations block 224 formulates the difference between the basic value GK and the value 1, multiplies this difference by the weighting factor F3, and adds the value 1 to the result again.

The output signal from the logic operations block 224 is routed to a first input of a node 226. A pilot value generated by a block 228 for the air/fuel ratio LK is injected into the second input of the node 226. The node 226 multiplies the pilot value by the correction value GK' and routes it for further processing to a block 230.

It is furthermore provided in the illustrative embodiment depicted in FIG. 2 that, by means of a switch 232, the block 204 enables or disables an anti-judder function which is provided in a block 234. In place of the complete disabling of the anti-judder function, the switch-over can also be made to another parameter block. The anti-judder function is supposed to avoid drive train vibrations, in that given rapid changes in engine speed, the ignition angle ZW is shifted by a specific amount. In the case of a positive speed gradient, the ignition angle is retarded; in the case of a negative speed gradient, it is advanced to increase the torque in phase opposition to the vibration and, respectively, to lower it. The engine speed n is applied to the input of-the block 234. At its output, the block 234 makes available a change in the ignition angle, which can be injected via the switch 232 into the block 210, where it is added to the corrected ignition angle ZW'. The block 204 only closes the switch 232 when the weighting factor F1 is small compared to the value 1. The functioning method of the block diagram shown in FIG. 2 is clarified on the basis of the flow chart of FIG. 3.

FIG. 3 shows a flow chart of a method according to the present invention for determining the weighting factors F1, F2 and F3. The flow chart begins with a step 300, in which it is established whether the internal-combustion engine 100 is being started. Step 300 is repeated until the query of step 300 is fulfilled. Following step 300, the value 0 is assigned to a variable IL in step 302. The variable IL represents, for example, the load integral, i.e., the load L integrated since start-up of the internal-combustion engine 100. Furthermore, the temperature of the internal-combustion engine 100 is determined in step 302 and stored as a value TBKMstart. A step 304 follows step 302. In step 304, a threshold value ILMax is determined for the load integral IL. If this threshold value ILMax is reached, the run-through of the flow chart is ended. The threshold value ILMax is read out of a characteristic curve, which extends over the start-up temperature TBKMstart of the internal-combustion engine 100 determined in step 302. The result is that given a cold start-up of the internal-combustion engine 100, the end of the flow chart is first reached when the load integral IL is larger than in the case of a warm start-up.

Step 306 follows step 304. In step 306, the load integral IL is scaled to the value ILMax, i.e., a relative load integral ILRel is determined, in that the load integral IL is divided by the threshold value ILMax. Following step 306 is a step 308, in which the query is made whether the relative load integral ILRel is smaller than or equal to 1, i.e., whether the threshold value ILMax has not yet been exceeded. If the query is correct, then a step 310 follows. In step 310, the weighting factors F1, F2 and F3 are read out of characteristic curves, which depend in each case on the relative load integral ILRel. The weighting factors F1, F2 and F3 are used in accordance with FIG. 2 to establish how great an effect the basic values dZW, dLLW and GK determined with the engine characteristics maps 200, 212 and 222 have in the final analysis. A step 312, in which the load integral IL is updated, follows step 310. This can happen in that an integrator, which receives the load L as an input signal, takes over the current value. Step 306 follows step 312 again.

If the query of step 308 is not fulfilled, i.e., the relative load integral ILRel has exceeded the value 1, then the run-through of the flow chart is ended.

Figure 4:
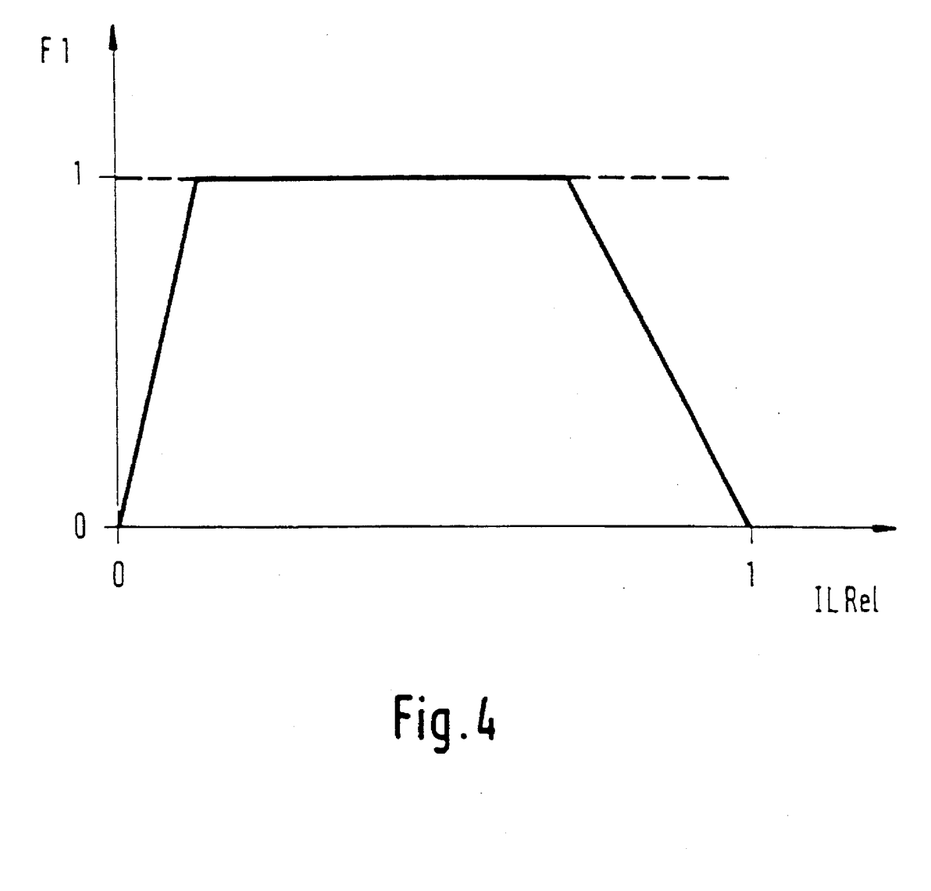
FIG. 4 is a characteristic curve of a weighting factor according to the present invention.

FIG. 4 depicts a diagram for a possible profile of a characteristic curve, out of which one of the weighting factors, for example F1, is read out in step 310 of FIG. 3, in dependence upon the relative load integral ILRel. The relative load integral ILRel is plotted on the abscissa and the weighting factor F1 on the ordinate. The curve shape rapidly rises from 0 for a relative load integral ILRel of 0 to a value 1, remains constant at 1 for a period, and finally slowly drops again to a value 0 for a relative load integral ILRel of 1. In the range in which the weighting factor F1 is constantly equal to 1, the basic value dZW is completely effective in accordance with FIG. 2, i.e., the correction value dZW' is equal to the basic value dZW. For a relative load integral ILRel of 0 and for a relative load integral ILRel greater than 1, the weighting factor F1 is equal to 0, i.e., the ignition angle ZW is not influenced by the basic value dZW output by the engine characteristics map 200. To produce a soft transition between the ranges of complete influence and of non-existing influence, the weighting factor F1 is increased via a ramp or by another suited function from 0 to 1, or rather lowered from 1 to 0.

This soft transition can, however, be replaced by a stepped transition between 0 and 1, when a parameter is supposed to be influenced by the weighting factor, which cannot assume any intermediate values. In such a case, the parameter would serve to control a switching operation, i.e., the parameter only represents the two states "on" and "off". Such a switching operation could be, for example, the switching on and off of the secondary air pump 122. As a rule, the secondary air pump 122 is switched off and is only switched on in certain operating states. This switching on and off in dependence upon the operating state can be controlled by means of a weighting factor. The switching operation can be coordinated by means of the ignition-angle intervention, the intervention performed on the throttle valve 108 or the idle-speed actuator 113, or by means of the intervention performed on the air/fuel ratio. The switching operation released by the weighting factor can also be applied to switch on and off an intake-manifold heating element, an electric catalytic-converter heating, a burner unit for heating the catalytic converter or an exhaust-gas valve, etc.

Figure 5:
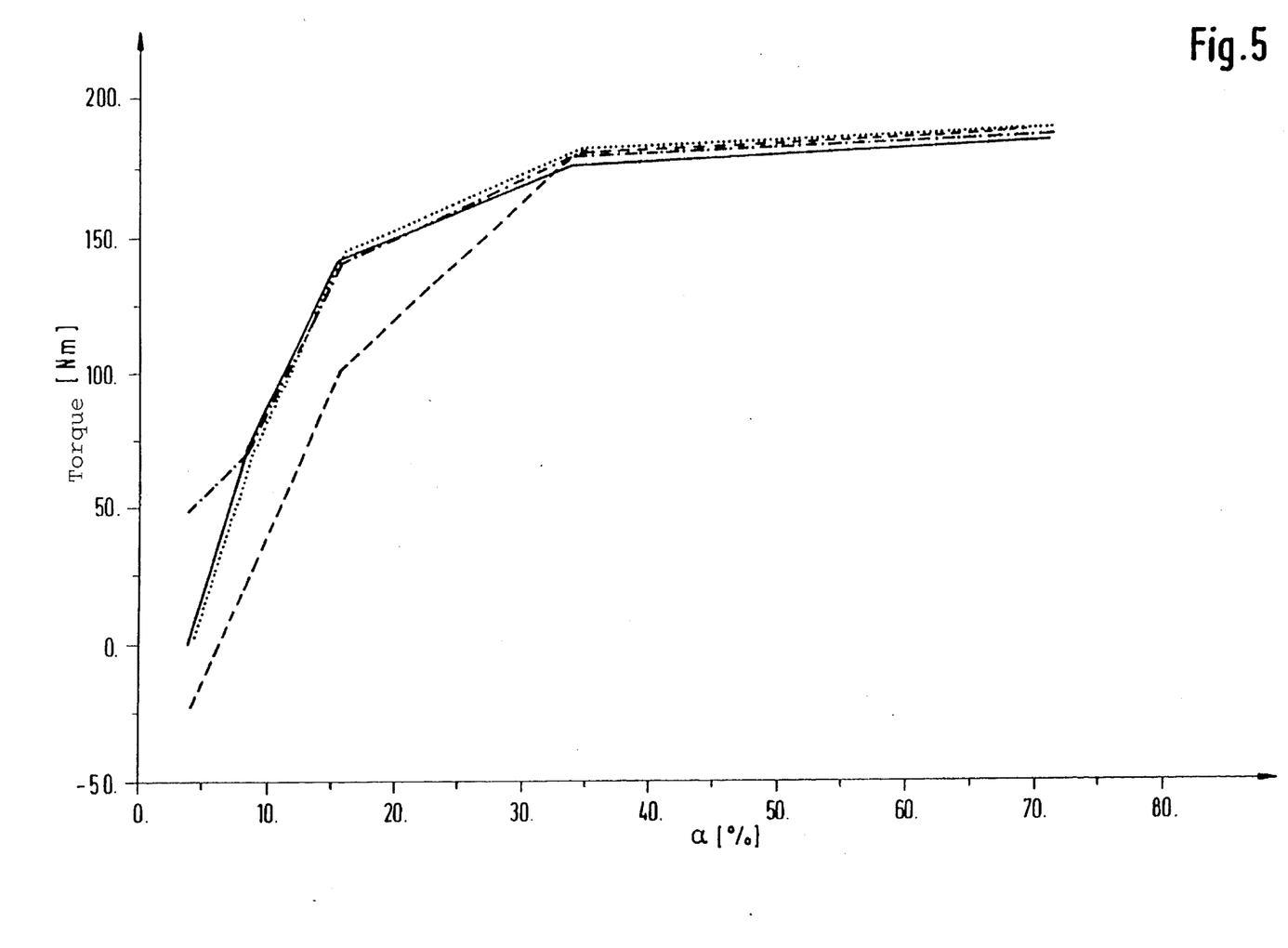
FIG. 5 is a diagram of the accelerator-pedal characteristic at an engine speed of 1,720 r.p.m., with and without intervention in the ignition angle and/or in the throttle valve or the idle-speed actuator.

FIG. 5 illustrates the effect of the method according to the present invention on the accelerator-pedal characteristic. In the diagram of FIG. 5, the torque of the internal-combustion engine 100 is plotted in dependence upon the opening angle ∝ of the throttle valve 108. All of the curves were recorded at a constant engine speed of 1,720 rpm.

The solid line depicts the normal accelerator-pedal characteristic, without an intervention being performed on the ignition angle ZW or the idle-speed actuator 113.

The broken-line curve shows the accelerator-pedal characteristic for the case that the ignition angle ZW was retarded, but the idle-speed actuator 113 was not influenced. At low opening angles of the throttle valve 108—here only the shifting of the ignition angle ZW is active—the broken-line curve lies clearly below the solid curve, i.e., the accelerator-pedal characteristic was changed considerably by shifting the ignition angle ZW.

In the case of the dotted-line curve, to compensate for the shift in the ignition angle ZW, the intervention in accordance with the present invention was additionally performed on the idle-speed actuator 113 with the result that the original accelerator-pedal characteristic (solid line) is re-established.

In the case of the dot-dash curve, in addition to the shifting of the ignition angle ZW, the idle-speed actuator 113 is completely opened.

Therefore, FIG. 5 illustrates that the method according to the present invention makes it possible for a late ignition to be implemented and, thus for example, for the catalytic converter 116 to be heated, without significantly changing the accelerator-pedal characteristic.

In the embodiments described above, appropriate triggering of the idle-speed actuator prevented an ignition-angle intervention from affecting the torque. If the present invention is applied in the context of an electronically controlled throttle valve, then, in place of the idle-speed actuator, the throttle valve can be triggered accordingly. In accordance with such an embodiment of the present invention, instead of the signal for the opening angle ∝ of the throttle valve 108, a signal produced by an accelerator-pedal sensor is injected into the engine characteristics map 212.

It should be understood that the types of logic operations—for example addition or multiplication—assigned in each case to the nodes of FIG. 2, can each be replaced by other suited logic operations. The signals involved in the logic operation are then to be adapted accordingly to the type of logic operation. For example, if the multiplication type of logic operation is selected for the node 202, then the value 1 is to be specified for the weighting factor F1 in the case that the basic value dzW is not supposed to be changed. In the case of the addition type of logic operation, the value 0 would then be specified under the same conditions for the weighting factor F1.

In accordance with a further embodiment of the present invention, the weighting factors F1 and F2 are identical.

Moreover, in accordance with a still further embodiment of the present invention, a weighting factor F4 can also be provided in conjunction with a separate intervention into the idling speed. Let's assume that the idling-speed intervention has the same structure as the interventions depicted in FIG. 2 in the ignition angle ZW, in the opening angle LLW of the idle-speed actuator 113, and in the air/fuel ratio LK. The weighting factor F4 would be linked using an appropriate basic value to a correction value, and the setpoint value for the idling speed would be influenced by the correction value. Contrary to the correction value dLLW', the purpose of the correction value for the idling speed is not to compensate for the influence of the correction value dZW' on the torque of the internal-combustion engine 100, but rather to alter the idling speed.

Depending on the specific embodiment, the basic values dZW, dLLW and/or GK can also depend on other signals, which describe the operating state of the internal-combustion engine 100. Such a signal could be, for example, the temperature of the internal-combustion engine 100.

In accordance with yet another embodiment of the present invention, the weighting of the basic values dZW, dLLW and GK by the weighting factors F1, F2 and F3 is eliminated. In accordance with this embodiment, the basic values are already weighted in dependence upon the operating state at the time when they are generated by the engine characteristics maps 200, 212 and 222. In such an embodiment the engine characteristics maps must be designed accordingly with respect to their dependency. In the specific embodiment with weighting, the operating parameters must be considered, in particular, in those engine characteristics maps from which the weighting factors are determined.

What is claimed is:

1. A method for open-loop control of an internal-combustion engine in which an ignition angle and air inducted by the internal-combustion engine are influenced in at least one operating state of the engine, the method comprising the steps of:

calculating first and second correction values as a function of at least one operating parameter of the internal-combustion engine selected from a group of parameters including load, intake air flow, engine temperature, catalytic converter temperature, throttle valve opening, pressure, exhaust oxygen content and engine speed, such that an effect of the first correction value on a torque of the internal-combustion engine is compensated by the second correction value;

generating a first control signal as a function of a first value for the ignition angle and the first correction value;

generating a second control signal as a function of a second value for the air inducted by the internal-combustion engine and the second correction value;

applying the first control signal to an ignition controller to control the ignition angle; and applying the second control signal to an intake air controller to control the air inducted by the internal-combustion engine.

2. The method according to claim 1, further comprising the steps of:

calculating a third correction value as a function of at least one operating parameter of the internal-combustion engine selected from a group of parameters including intake load, air flow, engine temperature, catalytic converter temperature, throttle valve opening, pressure, exhaust oxygen content and engine speed;

generating a third control signal as a function of the third correction value and a third value for an air/fuel ratio; and applying the third control signal to an air/fuel mixture controller to control the air/fuel ratio of the internal-combustion engine.

3. The method according to claim 1, wherein calculating the first and second correction values further include the steps of:

determining a first basic value and a second basic value as a function of at least one operating parameter of the internal-combustion engine selected from a group of parameters including load, intake air flow, engine temperature, catalytic converter temperature, throttle valve opening, pressure, exhaust oxygen content and engine speed;

determining a first specifiable weighting factor and a second specifiable weighting factor; and combining the first basic value and the second basic value with the first specifiable weighting factor and the second specifiable weighting factor, respectively, to generate the first and second correction values.

4. The method according to claim 3, wherein the first specifiable weighting factor is equal to the second specifiable weighting factor.

5. The method according to claim 3, wherein calculating the first and second correction values further include the step of:

specifying the first and second specifiable weighting factors such that the first and second correction values are effective only within a set of specifiable operating states, wherein an effectiveness of the first and second correction values at a beginning of one of the specifiable operating states increases in accordance with a first selectable function and the effectiveness of the first and second correction values decreases toward an end of the one of the specifiable operating states in accordance with a second selectable function.

6. The method according to claim 5, wherein the step of specifying further includes the step of specifying the first and second specifiable weighting factors as a function of at least one of the following operating parameters: time; number of crankshaft revolutions; integrated air mass; integrated fuel-injection quantity; and catalytic-converter temperature.

7. The method according to claim 5, wherein the step of specifying further includes the steps of:

generating an operating parameter ILRel by scaling a load integral IL to a threshold value ILMax; and specifying the first and second specifiable weighting factors as a function of at least one characteristic curve, the at least one characteristic curve being read as a function of the operating parameter ILRel.

8. The method according to claim 7, wherein the step of generating the operating parameter ILRel further includes the step of specifying the threshold value ILMax as a function of a start-up temperature of the internal-combustion engine.

9. The method according to claim 7, further comprising the step of producing a switching signal for at least one of a secondary air pump, an intake-manifold heating element, an electric catalytic-converter heating element, a burner unit for heating the catalytic converter, and an exhaust-gas valve, as a function of the operating parameter ILRel.

10. The method according to claim 7, further comprising the steps of:

producing a switching signal as a function of the operating parameter ILRel;

receiving the switching signal at a throttle valve in an intake system of the internal-combustion engine; and operating the throttle valve to influence the air inducted by the internal-combustion engine as a function of the switching signal.

11. The method according to claim 7, further comprising the steps of:

producing a switching signal as a function of the operating parameter ILRel;

receiving the switching signal at an idle-speed actuator which is arranged in a by-pass duct leading to a throttle valve in an intake system of the internal combustion engine; and operating the idle-speed actuator to influence the air inducted by the internal-combustion engine as a function of the switching signal.

12. The method according to claim 11, wherein:

the first correction value is combined with the first value for the ignition angle in selected operating states to generate the first control signal for retarding an ignition angle and for quickly heating up the catalytic converter in an exhaust duct of the internal-combustion engine; and the second correction value is combined with the second value for the air inducted by the internal-combustion engine in the selected operating states to generate the second control signal for further opening one of the throttle valve and the idle-speed actuator so that the accelerator-pedal characteristic is retained despite the retarding of the ignition angle.

13. The method according to claim 3, wherein determining the first basic value and the second basic value further includes the steps of:

determining the first basic value from a first look-up table as a function of a load of the internal-combustion engine and an engine speed of the internal-combustion engine; and determining the second basic value from a second look-up table as a function of an opening angle of a throttle valve of the internal-combustion engine and the engine speed.

14. The method according to claim 2, wherein the steps of calculating first, second and third correction values further include the steps of:

determining a first basic value and a third basic value from a first look-up table as a function of a load of the internal-combustion engine and an engine speed of the internal combustion engine;

determining a second basic value from a second look-up table as a function of an opening angle of a throttle valve of the internal-combustion engine and the engine speed; and combining the first, second, and third basic values with a first specifiable weighting factor, a second specifiable weighting factor, and a third specifiable weighting factor, respectively, to calculate the first, second, and third correction values.

15. A device for the open-loop control of an internal-combustion engine, an ignition angle and air inducted by the internal-combustion engine being influenced in at least one operating state, the device comprising:

a controller for performing the steps of:

determining a first basic value as a function of an operating state of the internal-combustion engine;

determining a second basic value as a function of the operating state of the internal-combustion engine;

calculating a first correction value by weighting the first basic value as a function of the operating state of the internal combustion engine;

calculating a second correction value by weighting the second basic value as a function of the operating state of the internal combustion engine, wherein the first and the second correction values are weighted so as to allow the second correction value to compensate for an effect of the first correction value on a torque of the engine;

generating a first control signal as a function of a first signal for the ignition angle and the first correction value;

generating a second control signal as a function of a second signal for the air inducted by the internal-combustion engine and the second correction value;

applying the first control signal to an ignition controller for controlling the ignition angle as a function of the first control signal; and applying the second control signal to an intake air controller for controlling the air inducted by the internal-combustion engine as a function of the second control signal.

\* \* \* \* \*